(12) United States Patent
Bravo

(10) Patent No.: US 7,229,016 B2
(45) Date of Patent: Jun. 12, 2007

(54) SYSTEM, METHOD AND APPARATUS FOR USE IN A TRANSPORTATION SYSTEM

(75) Inventor: Felipe Bravo, Santiago (CL)

(73) Assignee: Empresa de Transporte de Pasajeros Metro, S.A., Santiago (CL)

( * ) Notice: Subject to any disclaimer, the term of this patent is extended or adjusted under 35 U.S.C. 154(b) by 0 days.

(21) Appl. No.: 11/080,528

(22) Filed: Mar. 16, 2005

(65) Prior Publication Data

US 2006/0131399 A1 Jun. 22, 2006

(30) Foreign Application Priority Data

Dec. 22, 2004 (CL) .................................. 3276-2004

(51) Int. Cl.
*G07B 15/02* (2006.01)
*G06K 5/00* (2006.01)
(52) U.S. Cl. ......................... 235/384; 235/382; 705/13
(58) Field of Classification Search ................ 235/375, 235/382, 384; 705/13
See application file for complete search history.

(56) References Cited

U.S. PATENT DOCUMENTS

| | | | |
|---|---|---|---|
| 5,831,547 A * | 11/1998 | Ohtsuki et al. | 340/10.41 |
| 5,991,749 A * | 11/1999 | Morrill, Jr. | 705/44 |
| 6,749,118 B2 * | 6/2004 | Kobayashi et al. | 235/449 |
| 6,940,406 B2 * | 9/2005 | Sata | 340/552 |
| 2004/0127256 A1 * | 7/2004 | Goldthwaite et al. | 455/558 |
| 2004/0230489 A1 * | 11/2004 | Goldthwaite et al. | 705/26 |
| 2005/0005495 A1 | 1/2005 | Smith | |

* cited by examiner

*Primary Examiner*—Thien M. Le
*Assistant Examiner*—April Taylor
(74) *Attorney, Agent, or Firm*—Raymond Van Dyke; Nixon Peabody LLP

(57) ABSTRACT

A fare payment system including a proximity card; an antenna to read and write information onto the card, preferably a Mifare antenna; a processor connected to the antenna; a validator or POS processor, where the processor is entirely independent from the validator or POS processor; and one or more SAM storage modules which contain tables, access codes and other sensitive information. The SAM module is also controlled by the system administrator, which allows dynamic and diversified codes to guarantee the security and veracity of the information being transmitted. The system, method and apparatus of the present invention are capable of being programmed regardless of the POS processor, and any sensitive data can be withheld entirely from the suppliers of the antenna and POS processor technology. Additionally, because each antenna has its own processor, it can work both on-line and off-line. The processor also has a non-volatile EEPROM memory for information storage, but stores the access codes and other sensitive data in volatile memory so that a power loss will erase the access codes from the processor memory, leaving them only in the storage module memory. All of these features restrict access to sensitive system information and secure that information from outside suppliers.

21 Claims, 2 Drawing Sheets

SYSTEM, METHOD AND APPARATUS FOR USE IN A TRANSPORTATION SYSTEM

FIELD OF THE INVENTION

This application is directed to a system, method and apparatus that records usage and electronic fare collections through the use of a proximity card in a passenger transport system, e.g., to a control and safety device that has an electromagnetic wireless means of communication to establish an exchange of information with a proximity card, and also includes a security processor.

BACKGROUND OF THE INVENTION

It is increasingly frequent for public transport systems to use electronic means of payment instead of the traditional payment in cash. This is because it is more comfortable and safe, both for the provider of the services as well as the user, to have a means of payment that dispenses as much as possible with the use of cash for access to transportation services. Thus, the user acquires a discretionary amount, a certain number of trips or a period of time of travel without having to disburse cash in each trip in order to undertake it. A medium, however, is required that will record the available quotas for travel, and that can be used safely and expeditiously, according to the user's particular needs.

In recent years, different technologies have been developed to fulfill the above objective. In Chile, for example, a ticket with a magnetic strip in the Edmonson format has been used by the Santiago subway, each ticket representing one unit of travel, and was initially offered for sale at a reduced price in packages of 10. Tickets were later implemented using the same format and technology to store balances equivalent to money (Value ticket) or equivalent to units of travel (Multitravel ticket). The tickets were retained by the turnstiles at the time the last trip was made or the balance of money used up, obligating the user to acquire a new ticket.

The magnetic strip technology using cardboard tickets, either in the Edmonson or Industry Standard Organization (ISO) format (similar to bank cards), however, has certain limitations in terms of security and information storage capacity that impose restrictions on implementing certain systems of access to transportation, especially when prepayment is sought.

Lately, a technology has been sought to allow the user to have a means of prepaid access to transport systems, taking advantage of the familiarity that this type of product has, thanks to other massively-used services that have implemented it, and in order to create the habit of using electronic means of payment to avoid the use of cash per event.

This type of means of electronic payment has the advantage that the user can opt to buy a specific amount of a certain service, with the possibility of recharging the means of payment again without forfeiture, and consequently having to again acquire, the means.

In order to make this a reality, the market has developed cards with storage capacity and the appropriate levels of security that also have a communication system for the wireless exchange of information and a record and control system (the no-contact system) that makes them very simple and fast to use, benefiting both operators as well as users.

For example, U.S. Patent Publication US 2005/005495, dated Mar. 18, 2004, generally describes an electronic system of payment for public transport that includes an electronic no-contact card that is connected by an antenna to a reading and writing module circumscribed to a processor that is capable of transmitting information to an operations center by radiofrequency. This publication describes the utilization, albeit very generally, of a proximity card that can store the information on the amount available and be recharged for utilization in public transport systems.

There is a similar approach used in PCT Patent Publication No. WO 03105040, dated Dec. 18, 2003, which generally shows an electronic securities transfer device equipped with a proximity card and an associated interface. In this case, the device itself is a computer or mobile terminal where the transaction is actually performed.

In most of the applications implemented using this technology, a point of sale, validator (capturer) or standard PC processing capacity is used, and the storage capacity of these machines is sufficient to directly program the rules of business of a given application directly in them, as well as to keep the associated codes, dissemination tables (values of parameters for decisions in the rules of business) and transactions in the system therein.

Both such publications, as well as so many others in the prior art, show systems that are configured like the one shown in FIG. 1, and generally designated therein by the reference numeral 100. This configuration includes an antenna 110 that is compatible with a point of sale (POS) processor, Validator or PC, generally designated by the reference numeral 120, having the requisite equipment and information programmed therein for working the system 100, and which includes accessing codes 130, rules of business 140 and configuration tables 150 of the system 100, as well as a transmission means.

However, an inconvenience of this design is that whoever programs the POS or Validator (120) must thoroughly understand the particular application that has been implemented with respect to the proximity cards employed, designated by the reference numeral 160, including associated elements critical to security, such as access codes and data mapping, designated by the reference numerals 170 and 180, respectively.

If the desire is to have an application developed that is to be used in closed, protected, and controlled systems, and ideally with one single supplier of equipment, the system 100 design resolves relatively well the security of the system, but does not suffice for activation in unsafe locations. Therefore, if what is required is an application that operates in non-safe or hostile environments, where the desire is for there to be several technology suppliers in order not to run the risk of depending exclusively on one, with the consequent associated costs, using the aforementioned conventional technology generates the risk of losing control of the critical information, and with it, of obtaining lower levels of security.

Thus, the need arises to have a system, method and device that, on the one hand, will provide optimum levels of security, and on the other, be able to work with multiple suppliers without affecting the level of security attained. In other words, a device is required that will, regardless of the supplier of the information systems used, maintain its autonomy and characteristics of inviolability of its information parameters, which is associated with all transactions that can be performed using it.

SUMMARY OF THE INVENTION

The present invention is a system including a proximity card; an antenna to read and write information onto the card, preferably a Mifare antenna; a processor connected to the antenna; a validator or POS processor, where the processor is entirely independent from the validator or POS processor; and one or more SAM storage modules which contain tables, access codes and other sensitive information. The SAM module is also controlled by the system administrator, which allows dynamic and diversified codes to guarantee the security and veracity of the information being transmitted. The system, method and apparatus of the present invention are capable of being programmed regardless of the POS processor, and any sensitive data can be withheld entirely from the suppliers of the antenna and POS processor technology. Additionally, because each antenna has its own processor, it can work both on-line and off-line. The processor also has a non-volatile EEPROM memory for information storage, but stores the access codes and other sensitive data in volatile memory so that a power loss will erase the access codes from the processor memory, leaving them only in the storage module memory. All of these features restrict access to sensitive system information and secure that information from outside suppliers.

An advantage of the invention lies in that the components allow for its configuration to be separate from the supplier of equipment and/or software, principally the supply of security codes, the distribution of data in the card and the like. The system, method and device configuration of the present invention adds an additional level of security never before developed for this type of technology, which is even beyond the Mifare antenna technology, because it conceals the system codes, including those codes from equipment suppliers, as well as the location of the variables inside the proximity card with which it communicates.

BRIEF DESCRIPTION OF THE FIGURES

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
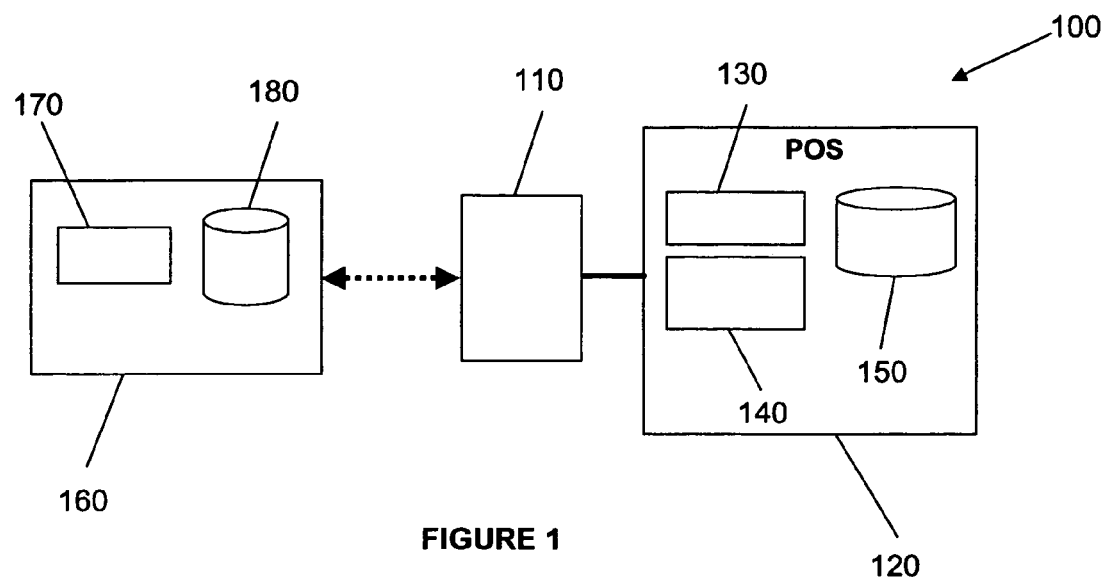
FIG. 1 represents a diagram of conventional system technology in the prior art.
Figure 2:
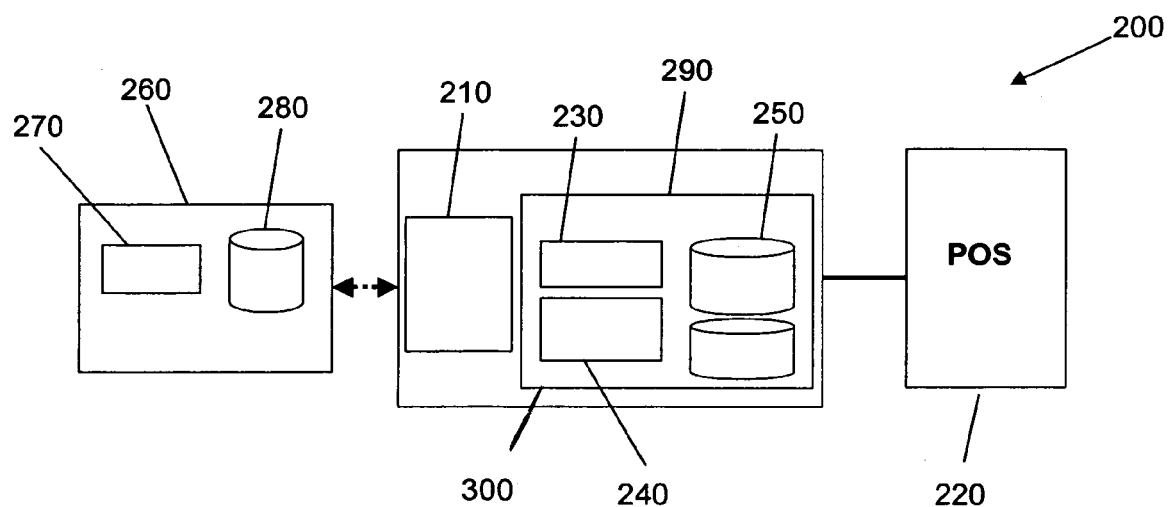
FIG. 2 represents an electronic collection system employing the principles and methodology of the present invention.

With reference now to FIG. 2 of the Drawings, there is illustrated therein a system and methodology of the present invention, designated generally by the reference numeral 200. As illustrated, system 200 includes an antenna 210 to read and write information on a proximity card 260 without any contact therewith, i.e., wirelessly. Antenna 210 is preferably a Mifare antenna. It should be understood that the antenna 210 is capable of receiving and sending information pertaining to the proximity card 260, e.g., information regarding the balance and transactions performed per access to a public transport service or charge of values therein. As further shown in FIG. 2, antenna 210 is connected to a compatible processor 290, preferably a microprocessor within a device, designated by the reference numeral 300 and further illustrated in FIG. 3. It should be understood that the device 300 according to the principles of the present invention is absolutely independent, from the security perspective, from a point of sale (POS) processor or Validator 220 of the transaction, as is commonly used in the prior art and described and depicted hereinabove in connection with FIG. 1.

Figure 3:
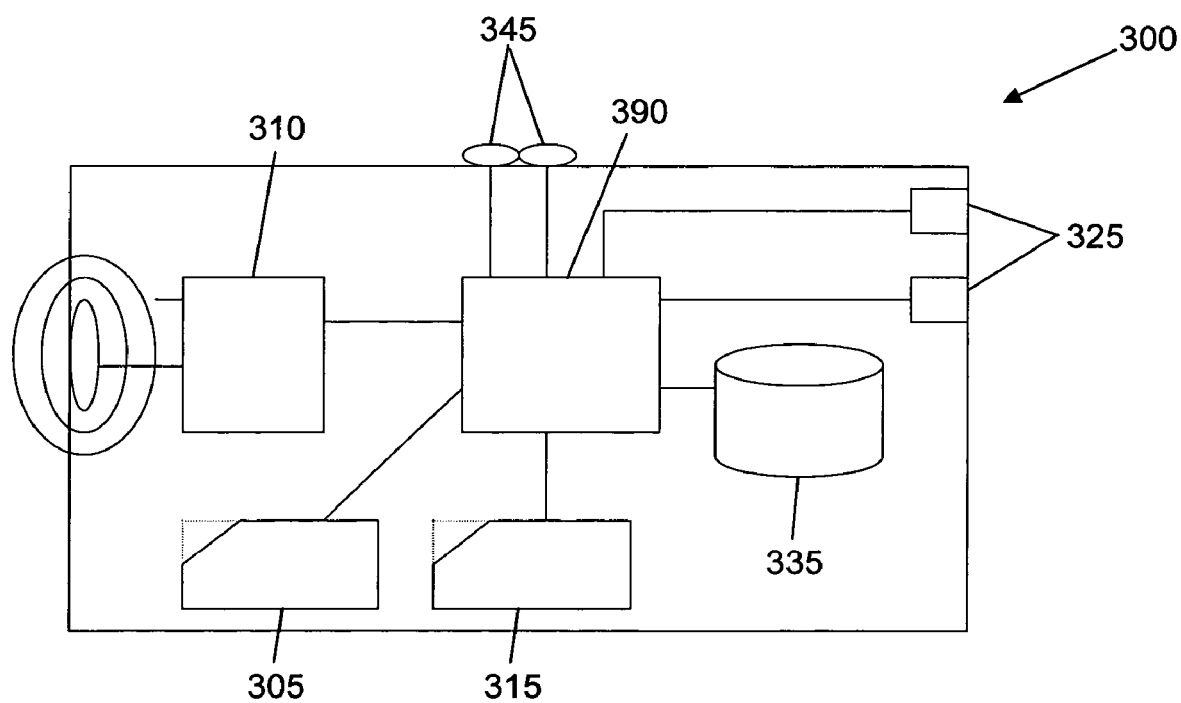
FIG. 3 represents a diagram of a device of the present invention, such as employed in the system and methodology shown in FIG. 2.

With reference now to FIG. 3 of the Drawings, depicting device 300 of the system 200, in conjunction with an antenna 310 and an independent processor 390, the device has two Security Account Manager (SAM) storage modules, designated by the reference numerals 305 and 315, respectively. Storage modules 305 and 315 are preferably based on smart microelectronics, and store all tables, access codes and sensitive data on the method of electronic transactions for the administrative system 200. For this purpose, the SAM modules 305 and 315 may also controlled by a system administrator through special control routines to which information must be provided in order for the device to enter into operation. The entire configuration of the system 200 and the device 300 also includes several dynamic and diversified codes to guarantee the security and veracity of the information that is being transmitted.

Within the configuration illustrated in FIGS. 2 and 3, the device 300 of the present invention is capable of receiving the programming of the functions inherent to a particular fare collection system regardless of the particular point of sale (POS) employed, i.e., the improved configuration of the present invention separates the POS from the access codes, the position of the variables and rules of business, achieving a total independence from suppliers when controlling the security of the system.

The device 300 according to the present invention also has ports for communication, designated generally by the reference numeral 325, with the point of sale (POS) processor or Validator, e.g., the POS 220 of FIG. 2. However, the device 300 has a great advantage over the prior art, i.e., it can dispense with an on-line connection because it has its own processor 390. Being able to work off-line and distribute security to the device 300 provides an autonomous and safe environment.

The device 300 preferably also includes a non-volatile EEPROM memory module 335 connected to the processor 390 for information storage. The device 300 also has LED displays, designated generally by the reference numeral 345, that show that the device 300 is working. The device 300 also includes a timer, e.g., as part of the processor 390, to synchronize the date and time register of transactions.

As further illustrated in FIG. 3, the device 300 of the present invention preferably includes more than one storage module, i.e., the aforementioned modules 305 and 315, which provide the device 300 a measure of versatility to secure access codes thereon safely, as well as data mapping and sensitive information, from a second application or a second set of information from the same application. Furthermore, in a preferred embodiment, the additional module, e.g., module 315, may be accessed only by the specific device to which it was assigned or installed. Since the device 300 acts autonomously with respect to the point of sale (POS) processor or Validator 220, as illustrated and described in connection with FIG. 2, the access codes and dating mapping reflected in a position table do not need to be delivered to the supplier of the application of the transaction logic system 200. In this fashion, different suppliers may safely provide such applications. It should be understood that the access codes can be modified at any time on-line from a central security server if the officer responsible for the system finds a security breach.

Moreover, the device 300 allows the access codes, once obtained from the storage module 310/315, to be stored in the volatile memory of the processor 390 so that a power outage or an attempt at penetration of the device 300 or system 200 causes the access codes to disappear. Each storage module 310/315 also has its own application that blocks access after a defined number of failed attempts are made to access the data stored in it.

As also shown in FIG. 3, the ports 325 for communication of the device 300 allow it to be connected to a point of sale and fixed charge processor, to a self-service processor at point of sale and charge, to a processor placed at a mobile point of sale, to a Validator in public transportation vehicles or at fixed access control points, as designated in FIG. 2 by the reference numeral 220.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed:

1. A fare payment device for a passenger transport system, said fare payment device comprising:
    an antenna, said antenna wirelessly transmitting and receiving information pertaining to a proximity card used by a patron of said transport system;
    a processor, said processor connected to said antenna, said processor being independent from a point of sale (POS) processor or transaction validator; and
    a storage module, said storage module containing therein tables, access codes and sensitive data associated with a particular electronic transaction method, said fare payment device operating, pursuant to said particular electronic transaction method, independently of said point of sale processor or transaction validator.

2. The fare payment device according to claim 1, wherein said antenna comprises a Mifare antenna.

3. The fare payment device according to claim 1, wherein said processor is a microprocessor.

4. The fare payment device according to claim 1, further comprising:
    security software controlled by an administrator of the passenger transport system, said administrator using special control routines in order for said fare payment device to enter into operation, thereby allowing incorporation of several dynamic and diversified codes that will guarantee the veracity of the information being transmitted.

5. The fare payment device according to claim 1, further comprising:
    at least one port, said at least one port providing communication with a point of sale (POS) processor or validator.

6. The fare payment device according to claim 5, wherein said at least one port connects said fare payment device to an external point of sale device, said external point of sale device being selected from the group consisting of: a fixed point of sale and charge processor, a self-service processor at point of sale and charge points, a processor placed at a mobile point of sale, a Validator in public transport vehicles, and fixed access control points, whereby said fare payment device can work on-line or off-line.

7. The fare payment device according to claim 1, further comprising:
    at least one LED display, whereby the workings of the fare payment device may be visualized.

8. The fare payment device according to claim 1, further comprising:
    at least one non-volatile EEPROM storage module, said module being connected to said processor.

9. The fare payment device according to claim 1, further comprising:
    a volatile memory, whereby information stored in said volatile memory of said fare payment device disappears when there is a power outage or an attempt to penetrate said volatile memory.

10. The fare payment device according to claim 1, further comprising:
    timer able to synchronize the date and time register of the transactions made by said patron.

11. The fare payment device according to claim 1, wherein said storage module further comprises a second set of information, said second set of information comprising tables, access codes and sensitive data associated with an electronic transaction method.

12. A fare payment system for a passenger transportation system, said fair payment system comprising:
    a proximity card, said proximity card having security information, access codes and data mapping thereon;
    a fare payment device having an antenna, said antenna wirelessly transmitting and receiving information pertaining to said proximity card; a processor, said processor being connected to said antenna, said processor being independent from a point of sale (POS) processor or transaction validator; and a storage module, said storage module containing therein tables, access codes and sensitive data associated with a particular electronic transaction method, said fare payment device operating, pursuant to said particular electronic transaction method, independently of said point of sale processor or transaction validator; and
    a point of sale device, said point of sale device being isolated and separate from said fare payment device.

13. The fare payment system according to claim 12, wherein said point of sale device is selected from the group consisting of: a fixed point of sale and charge processor, a self-service processor at point of sale and charge points, a processor placed at a mobile point of sale, a validator in public transport vehicles and fixed access control points, whereby said fare payment device can work on-line or off-line.

14. A control device for recording the charge and electronic collection of fares in a passenger transportation system, said control device comprising:
- an antenna, said antenna transmitting to and receiving information from a proximity card;
- a processor, said processor being connected to and controlling operation of said antenna; and
- a memory, said memory storing security information therein, including configuration tables, access codes and rules of business,
- wherein said control device is configured to communicate with said proximity card via said antenna and with an external point of sale device; and wherein said control device operates independently of said external point of sale device.

15. The control device according to claim 14, wherein said antenna comprises a Mifare antenna.

16. The control device according to claim 14, further comprising;
- security software controlled by an administrator of the passenger transportation system, said administrator using special control routines in order for said control device to enter into operation, thereby allowing several dynamic and diversified codes to be incorporated that will guarantee the veracity of the information being transmitted.

17. The control device according to claim 14, further comprising: at least one LED display, whereby the working of the fare payment device may be visualized.

18. The control device according to claim 14, wherein said control device further comprises at least one non-volatile EEPROM storage module, said module being connected to said processor.

19. The control device according to claim 14, wherein said device communicates with an external point of sale device selected from the group consisting of: a fixed point of sale and charge processor, a self-service processor at point of sale and charge points, a processor placed at a mobile point of sale, a validator in public transport vehicles, and fixed access control points, whereby said control device can work on-line or off-line.

20. The control device according to claim 14, wherein said control device has a volatile memory, whereby information stored in said volatile memory of said control device disappears when there is a power outage or an attempt to penetrate said volatile memory.

21. The control device according to claim 14, wherein said memory further comprises a second set of information, said second set of information comprising tables, access codes and sensitive data associated with an electronic transaction method.

* * * * *